(12) United States Patent
Ishii et al.

(10) Patent No.: US 11,022,834 B1
(45) Date of Patent: Jun. 1, 2021

(54) VIEWING ANGLE CONTROL UNIT AND DISPLAY DEVICE INCLUDING SAME

(71) Applicant: Panasonic Liquid Crystal Display Co., Ltd., Hyogo (JP)

(72) Inventors: Masahiro Ishii, Hyogo (JP); Tetsuo Fukami, Hyogo (JP); Yukinori Kayama, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 16/794,915

(22) Filed: Feb. 19, 2020

(30) Foreign Application Priority Data

Dec. 23, 2019 (CN) .......................... 201911340197.2

(51) Int. Cl.
| | | |
|---|---|---|
| G02F 1/1335 | (2006.01) | |
| G02F 1/13 | (2006.01) | |
| G02F 1/1345 | (2006.01) | |
| G02F 1/1343 | (2006.01) | |
| G02F 1/1339 | (2006.01) | |

(52) U.S. Cl.
CPC ...... *G02F 1/133512* (2013.01); *G02F 1/1323* (2013.01); *G02F 1/1339* (2013.01); *G02F 1/13439* (2013.01); *G02F 1/13458* (2013.01)

(58) Field of Classification Search
None
See application file for complete search history.

(56) References Cited

U.S. PATENT DOCUMENTS

| | | | |
|---|---|---|---|
| 2005/0012888 A1* | 1/2005 | Fujioka | G02F 1/1339 349/153 |
| 2008/0084471 A1 | 4/2008 | Yabuta et al. | |
| 2010/0103148 A1* | 4/2010 | Okazaki | G02F 1/13471 345/204 |
| 2015/0002777 A1* | 1/2015 | Sugisaka | G02F 1/134336 349/46 |
| 2017/0146834 A1* | 5/2017 | Tak | G02F 1/133514 |
| 2018/0081472 A1* | 3/2018 | Xi | G06F 3/044 |
| 2018/0307079 A1* | 10/2018 | Chen | G02F 1/13439 |
| 2020/0041833 A1* | 2/2020 | Yanagisawa | G02F 1/1339 |

FOREIGN PATENT DOCUMENTS

CN 101036085 9/2007

* cited by examiner

*Primary Examiner* — Shan Liu
(74) *Attorney, Agent, or Firm* — Wenderoth, Lind & Ponack, L.L.P.

(57) ABSTRACT

The present disclosure relates to a viewing angle control unit and a display unit including the same, in which the viewing angle control unit includes: a first substrate disposed on a side of the surface of the liquid crystal display unit; a second substrate which opposes the first substrate; a liquid crystal layer arranged between the first substrate and the second substrate; and a seal assembly which is disposed between the first substrate and the second substrate and surrounds the liquid crystal layer and seals and separates the liquid crystal layer from the outside. At least part of the seal assembly is constituted by a seal section and a shade section which are stacked in a direction substantially perpendicular to opposing surfaces of the first substrate and the second substrate.

12 Claims, 9 Drawing Sheets

VIEWING ANGLE CONTROL UNIT AND DISPLAY DEVICE INCLUDING SAME

CROSS-REFERENCE TO RELATED APPLICATION

This application is based on and claims priority of Chinese application No. 201911340197.2 filed on Dec. 23, 2019. The entire disclosure of the above-identified application, including the specification, drawings and claims is incorporated herein by reference in its entirety.

TECHNICAL FIELD

The disclosure relates to the technical field of liquid crystal display, and in particular to a viewing angle control unit and a display device including the same.

BACKGROUND ART

In the prior art, a liquid crystal display unit generally has a wide viewing angle display effect in order to allow multiple viewers to view the display unit together from different angles. However, in some situations or occasions, such as browsing a private webpage or confidential information or entering a password in public, the wide viewing angle display effect makes it rather easy to for the information displayed on the display unit to be seen by others. As disclosed in Chinese patent 200580033721.1, a viewing angle control unit which can adjust the liquid crystal display unit is additionally installed on the display surface of an existing liquid crystal display unit in order to enable the liquid crystal display unit to select or adjust the width of the viewing angle of the display screen according to operating requirements, thus providing the ability for a user to prevent confidential information, for example, from being visible to others.

However, after additional installation of the viewing angle control unit which is constituted by attaching a substrate to another substrate, a seal section attached between the two substrates can cause the display performance of the liquid crystal display unit after additional installation of the viewing angle control unit to decrease due to the characteristics of light scattering emitted by a backlight of the liquid crystal display unit. In particular, when a conductive material is mixed into the seal section, the light scattering caused by the seal section can be more obvious, and a problem arises in that the display performance of the liquid crystal display unit decreases due to the light scattering.

SUMMARY

To solve the above technical problems, the disclosure aims to provide a viewing angle control unit which is used in combination with a liquid crystal display unit. Specifically, the viewing angle control unit can be assembled on a display side of the liquid crystal display unit, and can control the viewing angle in an electrically controlled manner, so as to allow the liquid crystal display unit to select or adjust the width of the viewing angle of the display screen according to operating requirements. The viewing angle control unit provided by the disclosure aims to solve the problem of decreased display performance due to light scattering caused by a seal section after additional installation of the viewing angle control unit, so that the liquid crystal display unit after additional installation of the viewing angle control unit reduces the influence of the light scattering from the seal section, and the display performance is improved. Accordingly, the existing viewing angle control unit is improved.

The viewing angle control unit provided by the disclosure includes: a first substrate arranged on one side of the surface of the liquid crystal display unit; a second substrate which opposes the first substrate; a liquid crystal layer arranged between the first substrate and the second substrate; a seal assembly, which is disposed between the first substrate and the second substrate and surrounds the liquid crystal layer, and seals and separates the liquid crystal layer from the outside, in which at least part of the seal assembly is constituted by a seal section and a shade section which are stacked in a direction substantially perpendicular to opposing surfaces of the first substrate and the second substrate.

In a present disclosure, at least part of the seal assembly disposed between the first substrate and the second substrate of the viewing angle control unit is constituted by the seal section and the shade section which are stacked in a direction substantially perpendicular to opposing surfaces of the first substrate and the second substrate. Therefore, the light scattered by entering the seal section, due to the arrangement of the shade section, is prevented from entering a direction perpendicular to opposing surfaces of the first substrate and the second substrate, that is, the viewing direction of a user. Meanwhile, when the shade section is constituted by a black material which can absorb visible light, the shade section can also absorb the scattered light generated at least due to the seal section, further reducing the display performance degradation resulting from the light scattering caused by the seal section of the viewing angle control unit.

In a present disclosure, the shade section may be provided on a side of the second substrate facing the first substrate, and the seal section is formed between the shade section and a side of the first substrate facing the second substrate.

The stacking direction of the shade section and the seal section may be specified, in which the second substrate defines a display surface formed after the viewing angle control unit is added to the liquid crystal display unit. Therefore, providing the shade section on a side of the second substrate facing the first substrate can absorb the scattered light generated due to the seal section. In addition, providing the shade section on the display side of the viewing angle control unit can reduce the influence of the scattered light generated by the seal section on the display performance to a greater extent.

In a present disclosure, at part of the seal assembly, the width of the shade section may be greater than that of the seal section in a direction in which the seal assembly surrounds the liquid crystal layer.

At part of the seal assembly, the width of the shade section may be greater than that of the seal section, so that the scattered light generated by the edge portion of the seal section can also be blocked or absorbed by the shade section with a higher probability, which can improve the shading performance of the shade section. On the other hand, if the seal section and the shade section are designed to have the same width, a problem may occur in that part of the material of the seal section can overflow to the side of the shade section (especially the inner side) in the process of pressing and packaging the first substrate and the second substrate, so that the surface area of the area in which the seal section generates scattering is increased, and the scattered light of the section is not easily blocked by the shade section, thus further affecting the display performance.

In a present disclosure, the seal section may be constituted by a conductive adhesive material.

The seal section may be constituted by a conductive adhesive material. In particular, the seal section can be an epoxy resin composition. The epoxy resin composition can be formed by combining epoxy resin, a curing accelerator, an inorganic filler and the like, and has the advantages of high bonding strength, good sealing performance, low expansion coefficient and shortening rate, excellent chemical-resistant function, excellent electrical function and the like, so as to provide conditions for diversified designs of circuit connection relations.

In a present disclosure, the seal section may have anisotropic conductivity and is only conductive in a direction substantially perpendicular to opposing surfaces of the first substrate and the second substrate.

The seal section may have anisotropic conductivity. In other words, the seal section is an anisotropic conductive adhesive. The anisotropic conductive adhesive is a special conductive adhesive which is only conductive in one direction while having high resistance or not being conductive in other directions, and can prevent two short-range conductive connection points from generating a short circuit between the lines. The components thereof can include a resin layer and conductive particles distributed within the resin layer. The conductive particles typically have magnetism, and can form a plurality of conductive paths with directional arrangements via the magnetic field effect.

In a present disclosure, the viewing angle control unit may further include: a first light transmitting conductive layer, arranged on a surface of the first substrate facing the second substrate; a second light transmitting conductive layer, arranged on a surface of the second substrate facing the first substrate, and the second light transmitting conductive layer is opposed to the first light transmitting conductive layer with the liquid crystal layer therebetween; a first power supply terminal, electrically connected to the first light transmitting conductive layer; and a second power supply terminal, electrically connected to the second light transmitting conductive layer.

A pair of light transmitting conductive layers may be arranged with the liquid crystal layer therebetween, that is, the first light transmitting conductive layer and the second light transmitting conductive layer which are electrically connected with the first power supply terminal and the second power supply terminal respectively. Therefore, when a voltage is applied between the first light transmitting conductive layer and the second light transmitting conductive layer, the liquid crystal in the liquid crystal layer rotates to disturb the polarized light part of the image light (linearly polarized light), so that the image cannot be easily seen when viewed from the side.

On the other hand, when viewed from the front side, the long-axis direction of the liquid crystal layer is consistent with the polarization direction of the image light. Therefore, the image light is not affected by the viewing angle control unit to be transmitted, ensuring that the image can be seen normally from the front side.

In a present disclosure, the first power supply terminal and the second power supply terminal may be disposed on the first substrate.

The first power supply terminal and the second power supply terminal may be both disposed on the first substrate, realizing centralized configuration of the electric elements, and facilitating the simplification of the manufacturing process and the packaging of the viewing angle control unit.

In a present disclosure, part of the seal assembly may define a first power supply terminal wiring area and a second power supply terminal wiring area, and in the second power supply terminal wiring area, the second light transmitting conductive layer has an extended layer extending from the shade section outwardly of the viewing angle control unit, and the seal section, at least in part, is located outward of the shade section so as to be electrically connected to the extended layer.

The seal section may establish an electrical connection between the second light transmitting conductive layer and the seal section in such a manner that the seal section is in part located outward of the shade section and is electrically connected to the extended layer of the second light transmitting conductive layer. The electrical connection can be established by the seal section between the second light transmitting conductive layer and the second power supply terminal located on the first substrate with a simple structure. Meanwhile, the scattered light caused by the partial seal section is absorbed or blocked by the shade section in the display direction near the liquid crystal layer side and does not affect the display performance since the partial seal section is located outward of the shade section.

In a present disclosure, the shade section may have a notch for the second light transmitting conductive layer to extend out in the second power supply terminal wiring area.

The arrangement of the notch may facilitate the second light transmitting conductive layer to extend out in the second power supply terminal wiring area.

In a present disclosure, in the second power supply terminal wiring area, the viewing angle control unit may further include a third light transmitting conductive layer formed on the first substrate and electrically isolated from the first light transmitting conductive layer, and the third light transmitting conductive layer is electrically connected to the second power supply terminal.

According to the technical solution, in the second power supply terminal wiring area, the third light transmitting conductive layer formed on the first substrate and electrically connected to the second power supply terminal can establish the electrical connection with the second light transmitting conductive layer located on the second substrate via the seal section, so that the second power supply terminal disposed on the first substrate is electrically connected to the second light transmitting conductive layer disposed on the second substrate. With this simple structure, the purpose that the second power supply terminal is also disposed on the first substrate is realized.

In a present disclosure, in the first power supply terminal wiring area, the first light transmitting conductive layer may be located between the seal assembly and the first substrate, and is electrically connected to the first power supply terminal.

According to the technical solution, in the first power supply terminal wiring area, the first light transmitting conductive layer is located between the seal assembly and the first substrate, that is, between the seal section and the first substrate, and can guarantee the establishment of the electrical connection between the first power supply terminal and the first light transmitting conductive layer with a simple structure and process. At the same time, an electrical conduction which can lead to control circuit abnormality is not formed since the shade section in the seal assembly is disposed on one side of the second substrate.

In a present disclosure, the first light transmitting conductive layer and the third light transmitting conductive layer may be formed in a same layer.

Although the first light transmitting conductive layer and the third light transmitting conductive layer are disposed separately, forming both of the first light transmitting conductive layer and the third light transmitting conductive layer in the same layer enables an etching process to be performed on the first light transmitting conductive layer and the third light transmitting conductive layer at the same time during the process, thereby simplifying the process steps, increasing productivity efficiency, and reducing manufacturing costs.

In a present disclosure, the second light transmitting conductive layer may be spaced apart from the seal assembly.

The second light transmitting conductive layer may be spaced apart from the shade section and the seal section, so as to prevent the second light transmitting conductive layer from being electrically connected to the first light transmitting conductive layer by mistake through the seal section, which causes abnormality of the circuit.

In a present disclosure, the inner surface of the shade section may be located inward of the viewing angle control unit when compared with the inner surface of the seal section.

In the technical solution, the inner surface of the shade section may be located inward of the viewing angle control unit when compared with the inner surface of the seal section, which can provide certain protection for the seal section, that is, when the material for forming each functional layer of the second substrate overflows in each process step, the material does not directly contact the seal section because of the blocking of the shade section, thereby preventing the sealing property of the seal section from being affected by the overflow material.

In a present disclosure, the shade section may be a Black Matrix.

In the existing preparation process of liquid crystal display, a Black Matrix is prepared on an array substrate in order to separate adjacent color resistances, block color gaps, and prevent light leakage or color mixture. The process and material technology is mature and stable, and can minimize cost and improve work efficiency by utilizing the existing Black Matrix material and the preparation process to form the shade section of the disclosure.

In a present disclosure, the thickness ratio of the shade section to the seal section may be 1:1.5~1:3.0 in their stacking direction.

If the proportion of the shade section in the seal assembly is too large, that is, the proportion of the seal section is too small, it is disadvantageous to ensure the sealing performance; and if the proportion of the shade section in the seal assembly is too small, that is, the proportion of the seal section is too large, it is disadvantageous to ensure the shading performance. According to the technical solution, it is preferable that when the thickness ratio of the shade section to the seal section is 1:1.5~1:3.0 in their stacking direction, the shade section can be ensured to effectively block and absorb the scattered light from the seal section while ensuring the sealing performance of the seal assembly.

To realize the above purposes, the present disclosure provides a liquid crystal display unit, in which the liquid crystal display unit includes the above viewing angle control unit.

DESCRIPTION OF EMBODIMENTS

Figure 1:
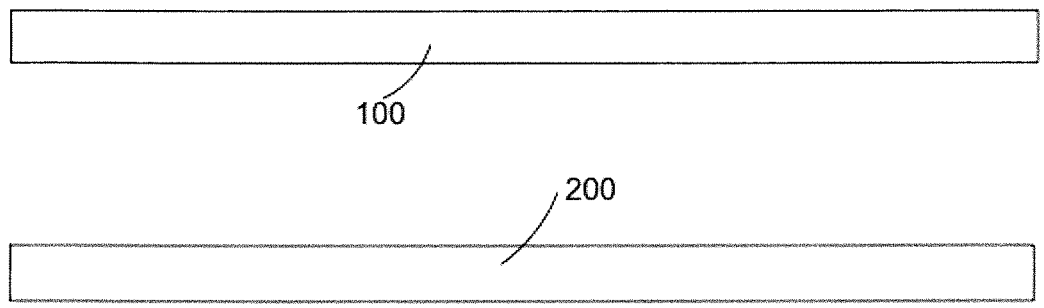
FIG. 1 is a schematic diagram showing the positional relationship of a viewing angle control unit and a liquid crystal display unit in a first embodiment of the present disclosure.
Figure 2:
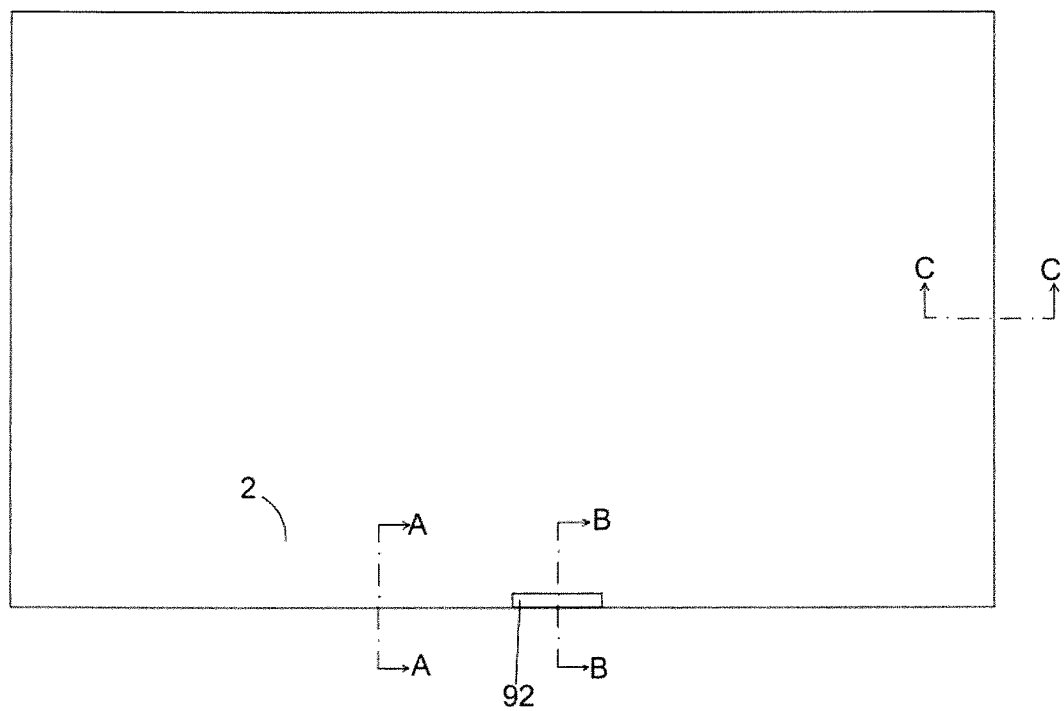
FIG. 2 is a top-view structural schematic diagram of the viewing angle control unit in the first embodiment of the present disclosure.
Figure 3:
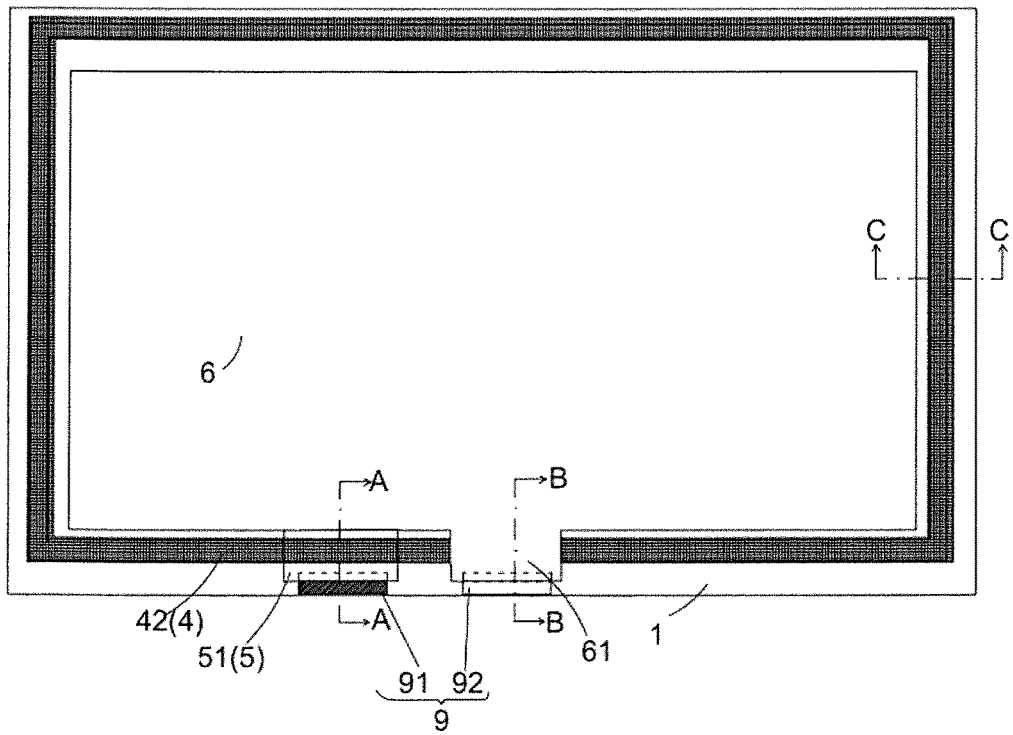
FIG. 3 is a top-view structural schematic diagram of the viewing angle control unit in FIG. 2 after removing the second substrate.
Figure 4:
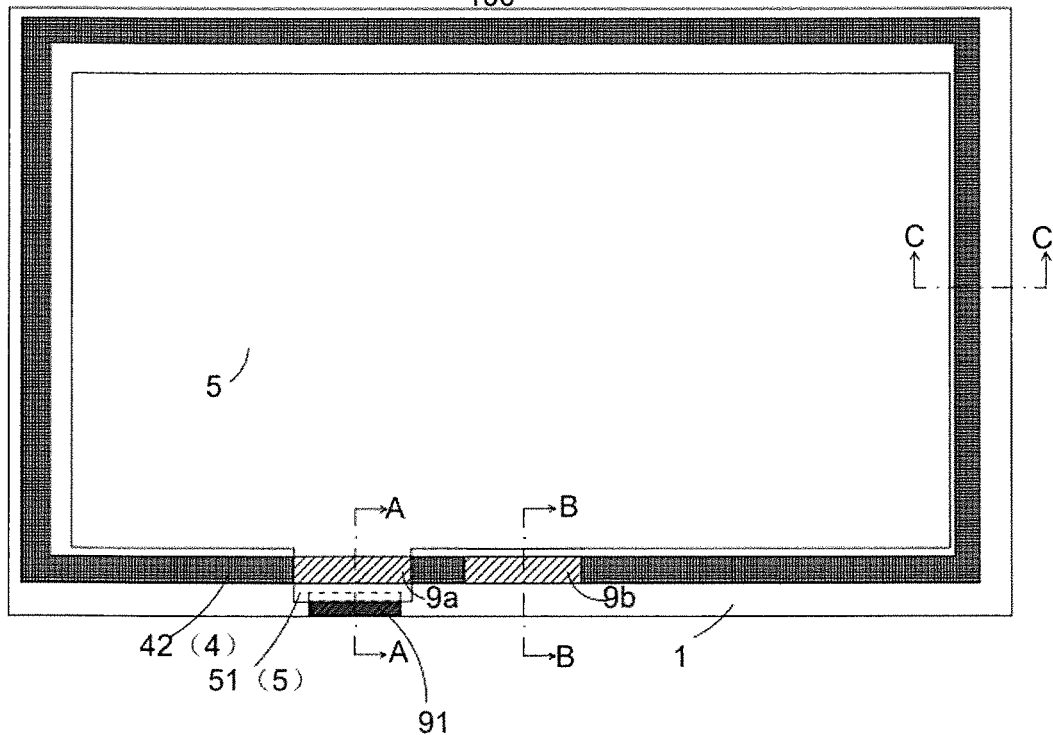
FIG. 4 is a top-view structural schematic diagram of the viewing angle control unit in FIG. 3 after removing a second light transmitting conductive layer, liquid crystal layer, a column spacer, a first alignment layer, and a second alignment layer.
Figure 5:
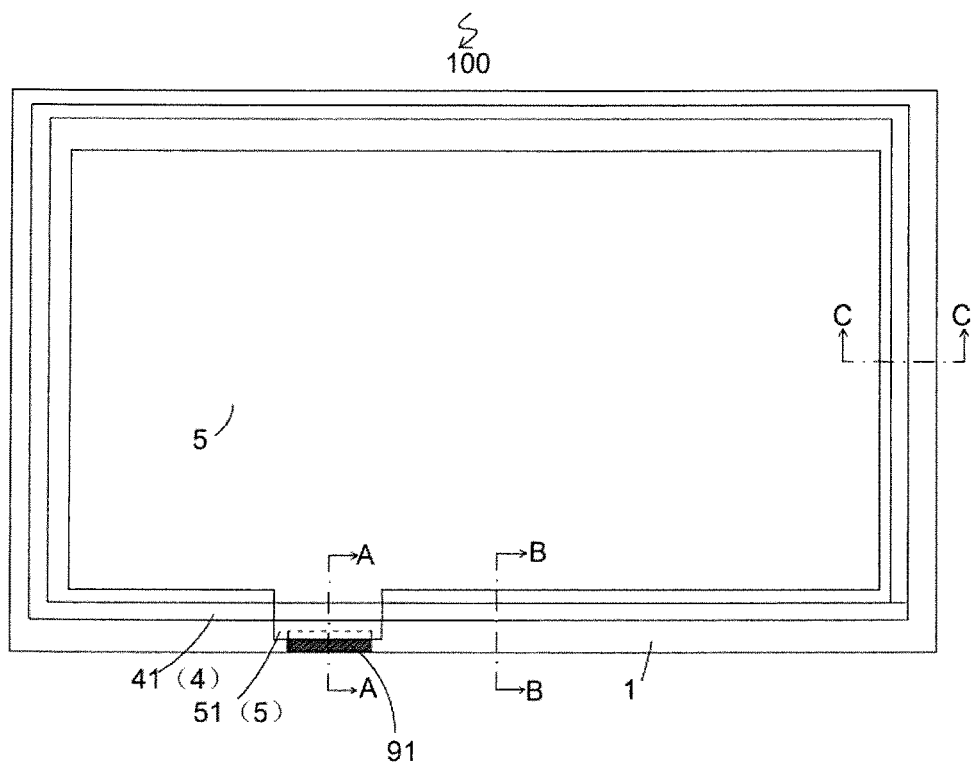
FIG. 5 is a top-view structural schematic diagram of the viewing angle control unit in FIG. 4 after removing the shade section.

Hereinafter, exemplary embodiments will be described in detail with reference to the accompanying drawings. However, the present disclosure is not limited to the following embodiments, but includes various changes, substitutions and variations within the technical scope of the present disclosure.

In the drawings, the dimensions of layers and areas may be enlarged for clarity of explanation. The terms "first", "second" and the like may be used to explain various elements, and the number of the elements is not limited by such terms. These terms are only used to distinguish one element from another. Therefore, an element referred to as a first element in one embodiment may be referred to as a second element in another embodiment. The singular form does not exclude the plural form unless the context requires otherwise.

In the following descriptions, the terms "include" or "contain" is used to represent a feature, a number, a step, an operation, an element, a part, or a combination thereof without excluding other features, numbers, steps, operations, elements, parts or combinations thereof. It should be understood that when an element of a layer, a film, an area, or a plate is referred to as being "on" or "under" another element, the element may be directly on another element, or one or more intervening elements may also exist therebetween. In addition, when an element is referred to as being "directly on" another element, there is no intervening layer therebetween.

As shown in FIG. 1, the present embodiment provides a viewing angle control unit 100 which is generally used in combination with a liquid crystal display unit 200. Specifically, the viewing angle control unit 100 can be assembled on the display side of the liquid crystal display unit 200, and can control the viewing angle in an electrically controlled manner, so as to allow the liquid crystal display unit 200 to select or adjust the width of the viewing angle of the display screen according to operating requirements. It should be noted that the specific work principle is not described since controlling the viewing angle in an electric control manner by the viewing angle control unit 100 is known. The viewing angle control unit 100 provided by the present embodiment aims to guarantee to solve the problem that the display performance decreases due to light scattering caused by a seal section 41 after additional installation of the viewing angle control unit 100, so that the liquid crystal display unit 200 after additional installation of the viewing angle control unit 100 reduces the influence of the light scattering from the seal section 41, and the display performance is improved. Accordingly, the existing viewing angle control unit is improved by the present embodiment.

FIGS. 2 to 8 are top-view schematic diagram and partial cross-sectional schematic diagrams of the viewing angle control unit in the first embodiment of the present disclosure in various situations. The main structure of the viewing angle control unit 100 as shown in FIGS. 2 to 8 includes: a first substrate 1, a second substrate 2, a liquid crystal layer 3, a seal assembly 4, a first light transmitting conductive layer 5, a second light transmitting conductive layer 6, a first alignment layer 7, a second alignment layer 8, a power supply terminal 9, and a plurality of column spacers 10.

Figure 6:
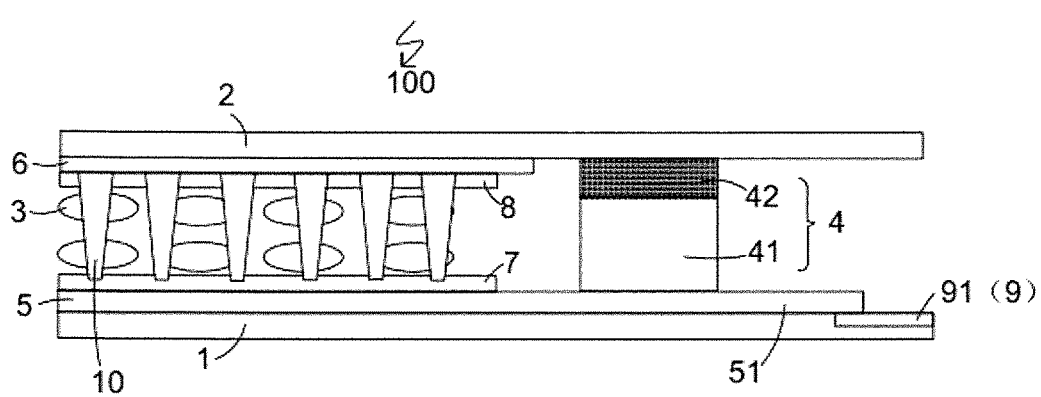
FIG. 6 is a partial cross-sectional structural schematic diagram of the viewing angle control unit in FIG. 2 taken along an A-A direction.

Specifically, as shown in FIG. 6, the first substrate 1 and the second substrate 2 of the viewing angle control unit 100 are disposed so as to oppose one another. The first substrate 1 and the second substrate 2 are parallel to each other and spaced apart by a certain distance. A plurality of column spacers 10 are arranged between the first substrate 1 and the second substrate 2 to maintain the spacing distance. Further, when the viewing angle control unit 100 is assembled to the liquid crystal display unit 200, the first substrate 1 is located on a first side near the liquid crystal display unit 200. Accordingly, the second substrate 2 is located on a second side further away from the liquid crystal display unit 200, that is, the second substrate 2 is the display surface of the display device composed of the liquid crystal display unit 200 and the viewing angle control unit 100. A user views the image, of which the viewing angle has been regulated by the viewing angle control unit 100, through the viewing angle from the display surface. The image sharpness is related to the display performance of the liquid crystal display unit 200 itself, and, on the other hand, is related to the display performance of the viewing angle control unit 100. The problem to be solved by the present embodiment is to reduce the influence on the display device by the display performance of the viewing angle control unit 100.

The first light transmitting conductive layer 5 and the second light transmitting conductive layer 6 are made of a ITO (Indium Tin Oxide) through which electricity is conducted, and generate an electric field for changing the arrangement of liquid crystal molecules (not shown) constituting the liquid crystal layer 3. In addition, the first light transmitting conductive layer 5 and the second light transmitting conductive layer 6 can be formed of a transparent material, and can transmit light incident from the outside. The first light transmitting conductive layer 5 is disposed on a surface, of the first substrate 1, which opposes the second substrate 2; and the second light transmitting conductive layer 6 is disposed on a surface, of the second substrate 2, which opposes the first substrate 1. The liquid crystal layer 3 is disposed between the first substrate 1 and the second substrate 2. Further, the liquid crystal layer 3 is disposed between the first light transmitting conductive layer 5 and the second light transmitting conductive layer 6. To keep the initial alignment of the liquid crystal molecules forming the liquid crystal layer 3 consistent, the first light transmitting conductive layer 5 and the second light transmitting conductive layer 6 are also respectively provided with a first alignment layer 7 and a second alignment layer 8, and the liquid crystal layer 3 is disposed between the first alignment layer 7 and the second alignment layer 8.

As shown in FIGS. 2 to 5, the power supply terminal 9 includes a first power supply terminal 91 for supplying power to the first light transmitting conductive layer 5 and a second power supply terminal 92 for supplying power to the second light transmitting conductive layer 6. In the present embodiment, the first power supply terminal 91 is disposed on the first substrate 1 and the second power supply terminal 92 is disposed on the second substrate 2. The seal assembly 4 is disposed at the outer edge portion between the first substrate 1 and the second substrate 2 and surrounds the liquid crystal layer 3, and seals and separates the liquid crystal layer 3 from the outside. In the present embodiment, at least part of the seal assembly 4 is constituted by a seal section 41 and a shade section 42 which are stacked in a direction substantially perpendicular to opposing surfaces of the first substrate 1 and the second substrate 2.

A partial area of the seal assembly 4 in the viewing angle control unit 100 defines a first power supply terminal wiring area 9a and a second power supply terminal wiring area 9b. The position of the first power supply terminal wiring area 9a and the second power supply terminal wiring area 9b correspond to the first power supply terminal 91 and the second power supply terminal 92, respectively. The first light transmitting conductive layer 5 has an extended layer extending from the seal section 41 outwardly of the viewing angle control unit 100, that is, the first extended layer 51 which traverses the first power supply terminal wiring area 9a and is electrically connected to the first power supply terminal 91. The second light transmitting conductive layer 6 has an extended layer extending from the shade section 42 outwardly of the viewing angle control unit 100, that is, the second extended layer 61 which traverses the second power supply terminal wiring area 9b and is electrically connected to the second power supply terminal 92. In the first power supply terminal wiring area 9a, the first light transmitting conductive layer 5 is provided between the seal assembly 4 and the first substrate 1, that is, between the seal section 41 and the first substrate 1, and can guarantee the establishment of the electrical connection between the first power supply terminal 91 and the first light transmitting conductive layer 5 with a simple structure and process. At the same time, an electrical conduction which can lead to control circuit abnormality is not formed since the shade section 42 in the seal assembly 4 is provided on a side of the second substrate 2.

In this embodiment, the seal section 41 can be an epoxy resin composition. The epoxy resin composition can be formed by combining epoxy resin, a curing accelerator, an inorganic filler and the like, and has the advantages of high bonding strength, good sealing performance, low expansion coefficient and shortening rate, excellent chemical-resistant function, excellent electrical function and the like. The material of the shade section 42 has no particular limitation as long as the material is capable of sealing, shading, or absorbing light, and the process has no particular limitation. The shade section 42 in the present embodiment is formed by a light blocking component which is commonly referred to as a Black Matrix. In the existing preparation process of liquid crystal display, the Black Matrix is prepared on an array substrate in order to separate adjacent color resistances, block color gaps, and prevent light leakage or color mixture. The process and material technology is mature and stable, and can minimize cost and improve work efficiency by utilizing the existing Black Matrix material and the preparation process to form the shade section 42.

In this embodiment, the seal section 41 and the shade section 42 are stacked in a direction substantially perpendicular to opposing surfaces of the first substrate 1 and the second substrate 2. Specifically, the seal section 41 is formed on the first substrate 1, and the shade section 42 is formed between the second substrate 2 and the seal section 41 to form a stacked structure.

The seal assembly in the prior art generally does not have a shade section and only includes a seal section such as sealant. The resin layer, as the main component of the sealant, has a characteristic of scattered light, and the inside thereof is usually doped with conductive particles (not shown) especially when the sealant combines electrical performance. In this case, the light scattering phenomenon caused by the sealant becomes more obvious, and the display performance of the liquid crystal display unit is also affected.

In embodiments of the present disclosure, the arrangement of the shade section 42 can block or absorb at least part of the scattered light generated by the seal section 41, and reduce the display performance degradation resulting from the light scattering caused by the seal section 41 of the viewing angle control unit 100 itself.

Figure 9:
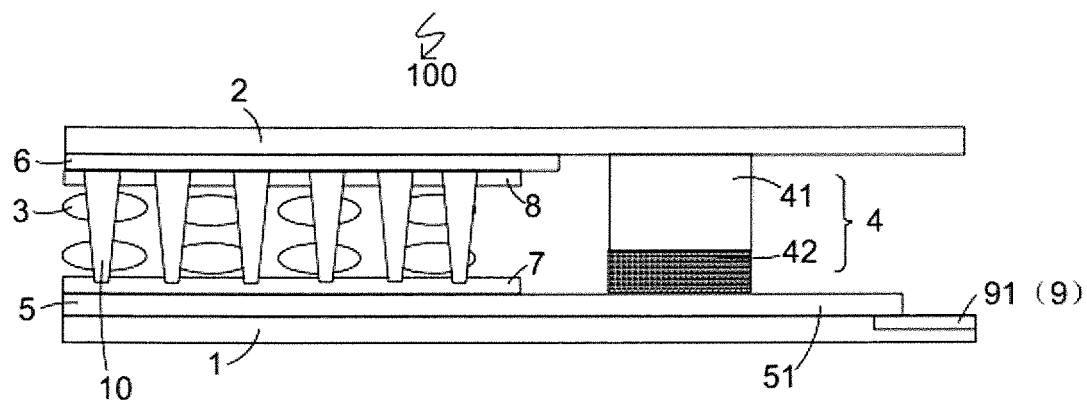
FIG. 9 is a structural schematic diagram of the viewing angle control unit in FIG. 6 after exchanging the positions of the shade section and the seal section.

It is noted that in the present embodiment, the stacking direction of the shade section 42 and the seal section 41 is specified, in which the second substrate 2 is a new display surface formed after the viewing angle control unit 100 is added to the liquid crystal display unit 200. Therefore, providing the shade section 42 on a side of the second substrate 2 facing the first substrate 1 can absorb the scattered light generated due to the seal section 41 by the shade section 42. In addition, providing the shade section 42 on the display side of the viewing angle control unit 100 can reduce the influence of the scattered light generated by the seal section 41 on the display performance to a greater extent since the shade section 42 itself has a blocking and shading effect. Specifically, due to the configuration shown in FIG. 9, part of the scattered light can be absorbed by the shade section 42 when the seal section 41 is disposed on a side of the second substrate 2 facing the first substrate 1, but part of the scattered light is directly transmitted to the outside (display side) from the contact surface of the seal section 41 and the second substrate 2, so that the influence of the scattered light on the display performance cannot be minimized. However, the user can also set the seal assembly 4 as the structure shown in FIG. 9 according to actual requirements since the present embodiment also has a certain improvement effect on the display performance of the viewing angle control unit 100. The above embodiments are all within the scope of the present disclosure.

In the present embodiment, as shown in FIG. 6, in the first power supply terminal wiring area 9a, the seal section 41 is directly formed on the first light transmitting conductive layer 5, and the shade section 42 is directly formed on the second substrate 2.

Figure 7:
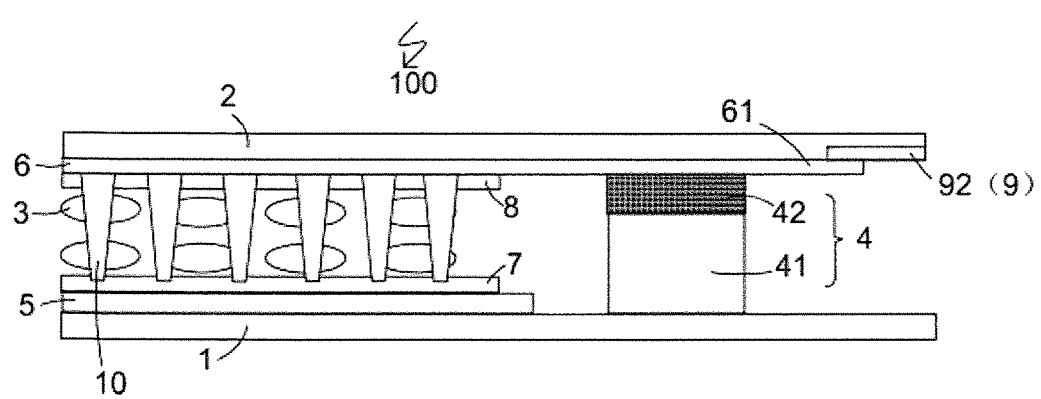
FIG. 7 is a partial cross-sectional structural schematic diagram of the viewing angle control unit in FIG. 2 taken along a B-B direction.

In the present embodiment, as shown in FIG. 7, in the second power supply terminal wiring area 9b, the seal section 41 is directly formed on the first substrate 1, and the shade section 42 is directly formed on the second light transmitting conductive layer 6.

Figure 8:
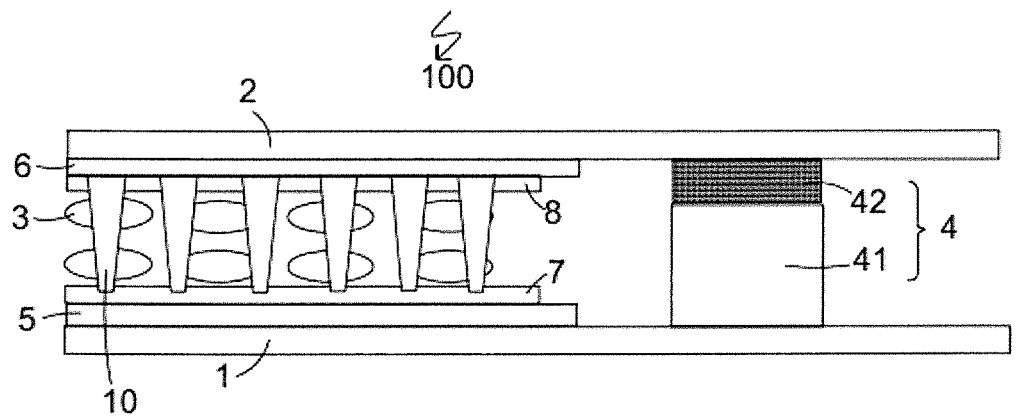
FIG. 8 is a partial cross-sectional structural schematic diagram of the viewing angle control unit in FIG. 2 taken along a C-C direction.

In the present embodiment, as shown in FIG. 8, outside of the first power supply terminal wiring area 9a and the second power supply terminal wiring area 9b, the seal section 41 is directly formed on the first substrate 1, and the shade section 42 is directly formed on the second substrate 2.

In the present embodiment, the first substrate 1 and the second substrate 2 can be an insulating substrate, such as a glass substrate or a polymer substrate, in which the polymer substrate can be made of by combining, for example, polyethylene terephthalate, polyethylene naphthalate, polycarbonate, polyacrylate, polyimide, or a combination thereof, but is not limited thereto.

In this embodiment, the first light transmitting conductive layer 5 and the second light transmitting conductive layer 6 can be made of indium tin oxide (ITO) or indium zinc oxide (IZO) with high electric conductivity and good light transmittance in the visible light region. In addition, the first light transmitting conductive layer 5 and the second light transmitting conductive layer 6 can also be formed by graphene or the like, which is transparent enough to transmit 98% or more of the light and has an electric conductivity that is 100 times or more than copper (Cu). Moreover, the first light transmitting conductive layer 5 and the second light transmitting conductive layer 6 can be formed on the first substrate 1 and the second substrate 2, respectively, through a deposition process, a photolithography process, an etching process, and the like. The preparation process of the first light transmitting conductive layer 5 and the second light transmitting conductive layer 6 has no particular limitation.

In the present embodiment, the first alignment layer 7 and the second alignment layer 8 are made of an alignment agent containing an oxygen-containing heterocyclic compound, and the prepared alignment film has better cohesion and adhesion. The alignment method of the liquid crystal molecules includes a contact-type friction method and a photo-alignment method, in which the contact-type friction method applies a physical stress alignment layer by using a roller, and the photo-alignment method forms a pretilt angle by irradiating ultraviolet (UV) light to the alignment layer.

In the present embodiment, the column spacer 10 can be, but not limited to, a curable resin composition. When selected as the column spacer 10, the curable resin composition at least contains a photosensitive polymer, a polyfunctional monomer, and photopolymerization initiator and has strong adhesion and elastic resilience.

In the present embodiment, the material of the shade section 42 preferably contains black porous titanium oxide ions with high porosity, a good diffuse reflection effect on light, and low specular reflectance.

Second Embodiment

Figure 10:
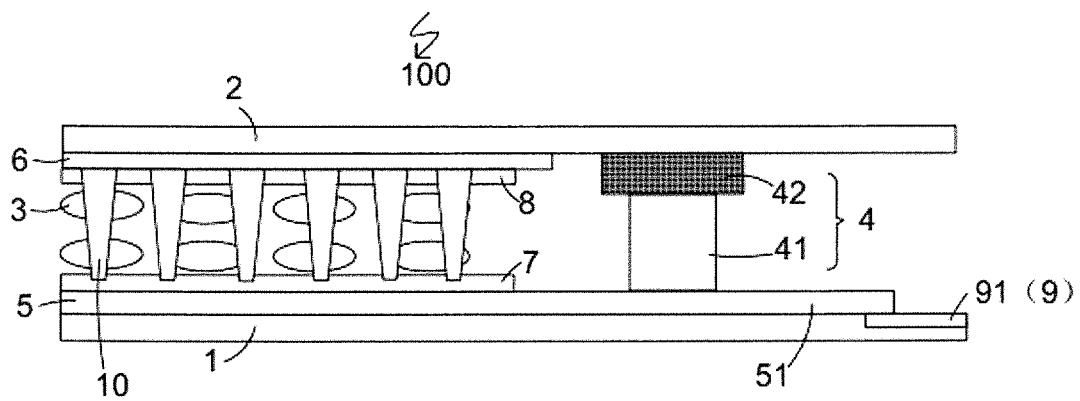
FIG. 10 is a partial cross-sectional structural schematic diagram of the viewing angle control unit taken along an A-A direction in a second embodiment of the present disclosure.
Figure 11:
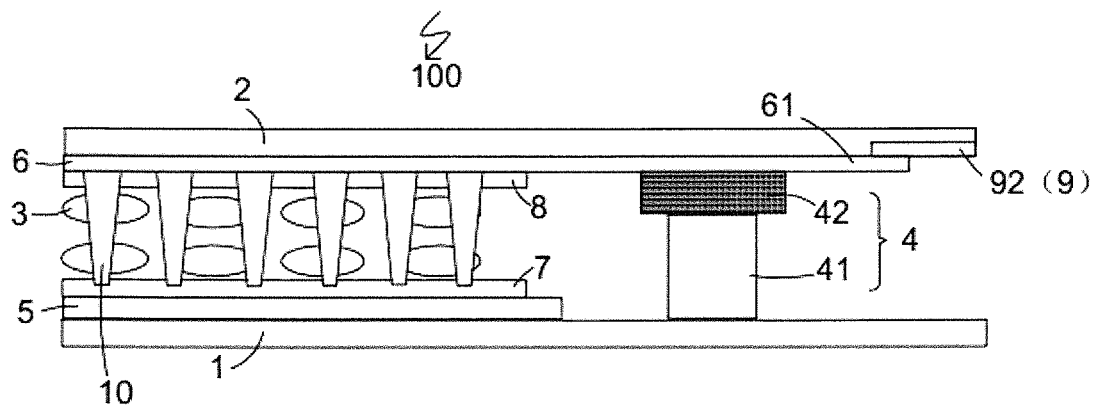
FIG. 11 is a partial cross-sectional structural schematic diagram of the viewing angle control unit taken along a B-B direction in the second embodiment of the present disclosure.
Figure 12:
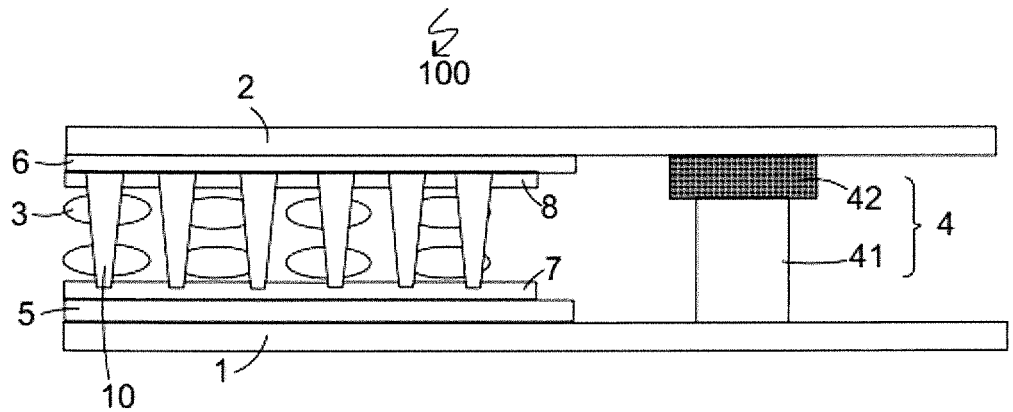
FIG. 12 is a partial cross-sectional structural schematic diagram of the viewing angle control unit taken along a C-C direction in the second embodiment of the present disclosure.

FIGS. 10 to 12 are partial structural schematic diagrams of the viewing angle control unit in a second embodiment of the present disclosure. In the second embodiment, each structure and reference numerals are the same as those in the first embodiment and will not be repeated herein unless otherwise specified.

Figure 13:
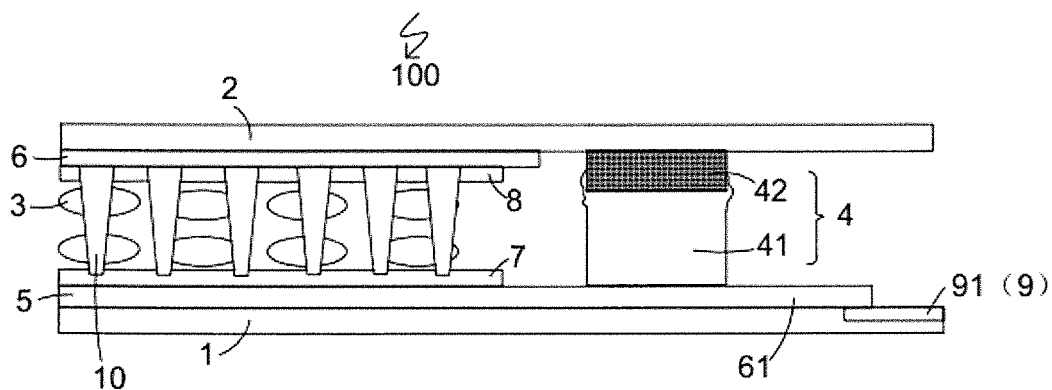
FIG. 13 is a structural schematic diagram of the viewing angle control unit in FIG. 6 when the seal section partially overflows to the side of the shade section while being pressed.
Figure 14:
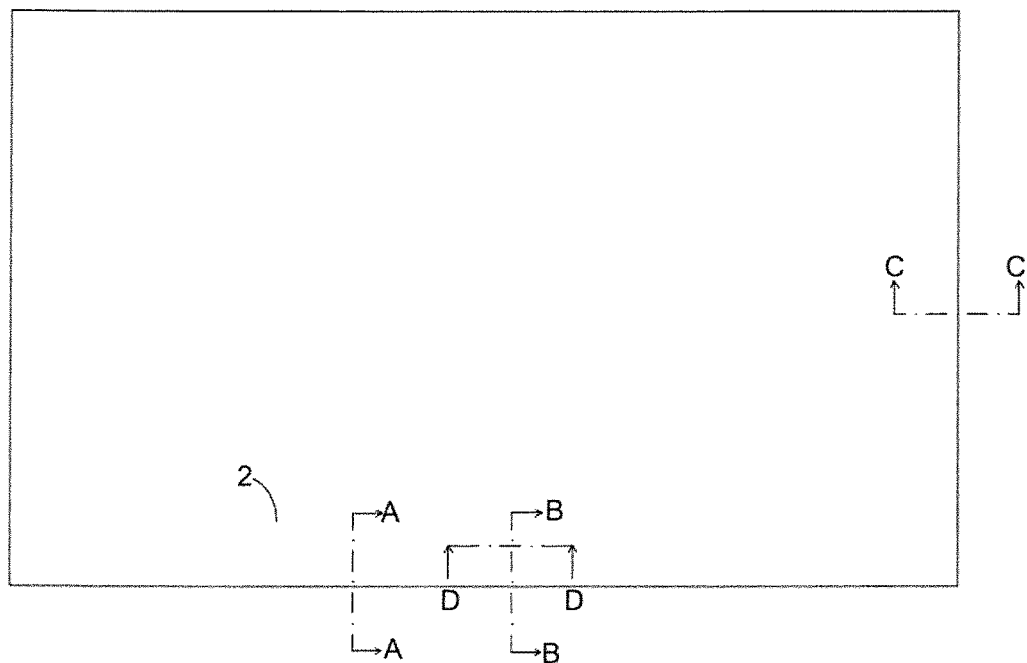
FIG. 14 is a top-view structural schematic diagram of the viewing angle control unit in a third embodiment of the present disclosure.

As shown in FIGS. 10 to 12, the main difference between the present embodiment and the first embodiment is that, in the present embodiment, the width of at least part of the shade section 42 is greater than the width of the seal section 41 in a direction in which the seal assembly 4 surrounds the liquid crystal layer 3. The arrangement mainly considers two aspects. Firstly, a wider shade section 42 can absorb the scattered light generated by the seal section 41 to a greater extent, and especially can ensure that the scattered light generated by the edge portion of the seal section 41 can be more likely to be blocked or absorbed by the shade section 42. Secondly, in the manufacturing process, there correspondingly exists a difference in the process since the viewing angle control unit 100 provided by the present disclosure has a structural difference with the existing viewing angle control unit 100. Specifically, considering the presence of the shade section 42, the sealing of the liquid crystal layer 3 is required by forming a shade section 42 on the second substrate 2, forming a seal section 41 at a position corresponding to the shade section 42 on the first substrate 1, pressing the second substrate 2 and the first substrate 1 toward each other, and curing the seal section 41 to complete the sealing of the liquid crystal layer 3 through photosensing or heating and the like. In the process, if the seal section 41 and the shade section 42 is designed to have the same width, then a problem may occur in that part of the seal section 41 overflows to the side of the shade section 42 due to the pressing as shown in FIG. 13. This results in a poor process, and increases the area of the region where the scattering occurs more by the seal section 41 since part of the material of the seal section 41 overflows to the side of the shade section 42. Moreover, the scattering caused by the part of the material of the seal section 41 is not easily absorbed or blocked by the shade section 42, so that the display performance of the viewing angle control unit 100 is influenced. Therefore, in the present embodiment, at least part of the width of the shade section 42 is set to be greater than that of the seal section 41, and preferably, each part of the shade section 42 can be set to have a greater width than the seal section 41. In this manner, when pressing the seal section 41 and the shade section 42, the seal section 41 is prevented from influencing the side (especially the inner side) of the shade section 42 even if the seal section 41 has a slight deformation, thus improving the display performance of the viewing angle control unit 100.

Further, it is preferable that the thickness ratio of the shade section 42 to the seal section 41 is 1:1.5~1:3.0 in their stacking direction. If the proportion of the shade section 42 in the seal assembly 4 is too large, that is, the proportion of the seal section 41 is too small, it is disadvantageous to ensure the sealing performance; and if the proportion of the shade section 42 in the seal assembly 4 is too small, that is, the proportion of the seal section 41 is too large, it is disadvantageous to ensure the shading performance. According to the technical solution, it is preferable that when the thickness ratio of the shade section 42 to the seal section 41 is 1:1.5~1:3.0 in their stacking direction, the shade section 42 can be ensured to effectively block and absorb the scattered light from the seal section 41 while ensuring the sealing performance of the seal assembly 4.

Third Embodiment

FIGS. 14 to 20 are top-view schematic diagrams and partial structural schematic diagrams of the viewing angle control unit in a third embodiment of the present disclosure in various situations. In the third embodiment, each structure and reference numerals are the same as those in the first embodiment or the second embodiment and will not be repeated herein unless otherwise specified.

Figure 15:
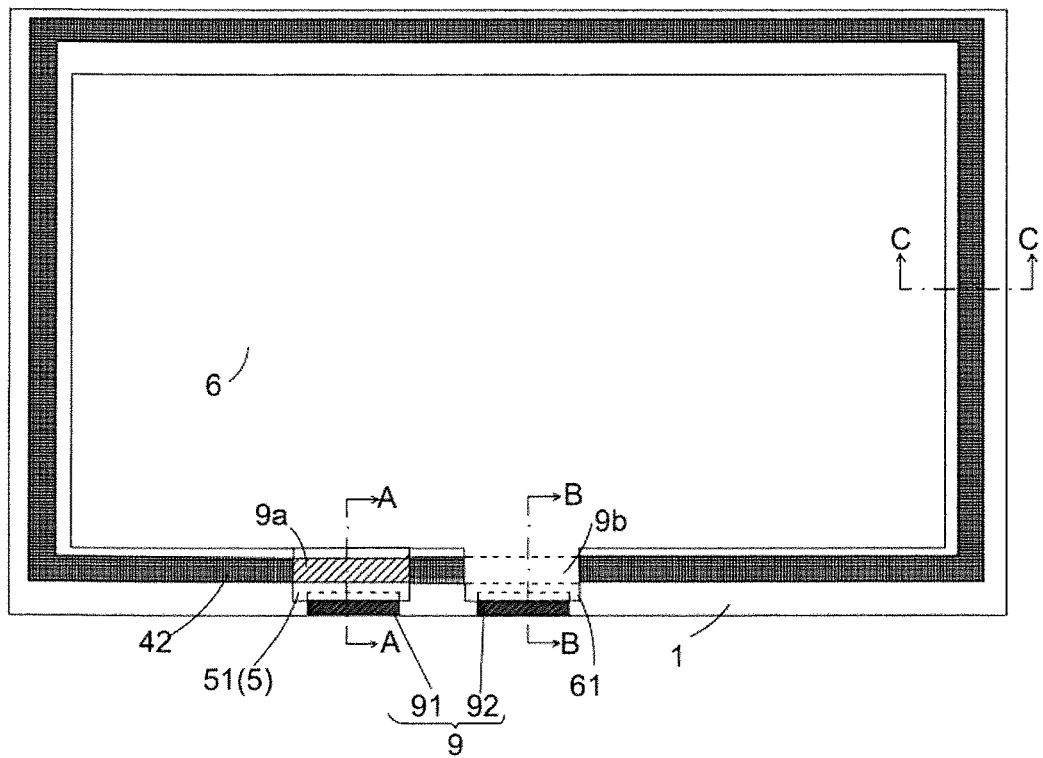
FIG. 15 is a top-view structural schematic diagram of the viewing angle control unit in FIG. 14 after removing the second substrate.
Figure 16:
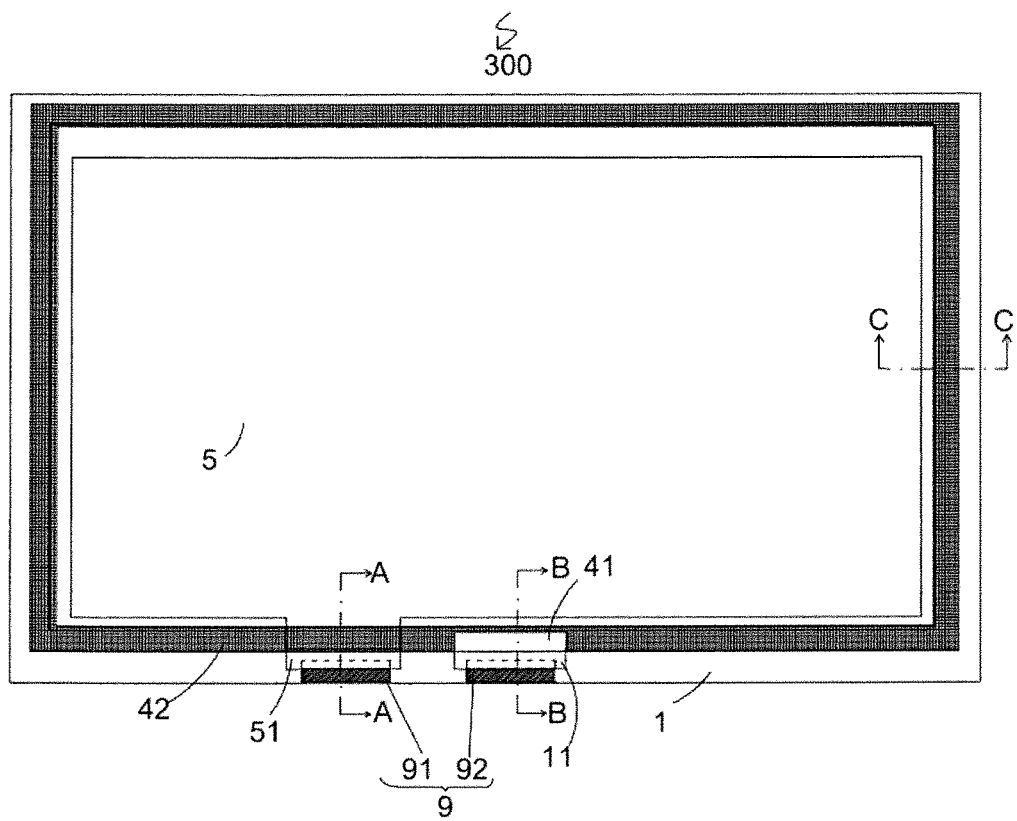
FIG. 16 is a top-view structural schematic diagram of the viewing angle control unit in FIG. 15 after removing the second light transmitting conductive layer, liquid crystal layer, the column spacer, the first alignment layer, and the second alignment layer.
Figure 17:
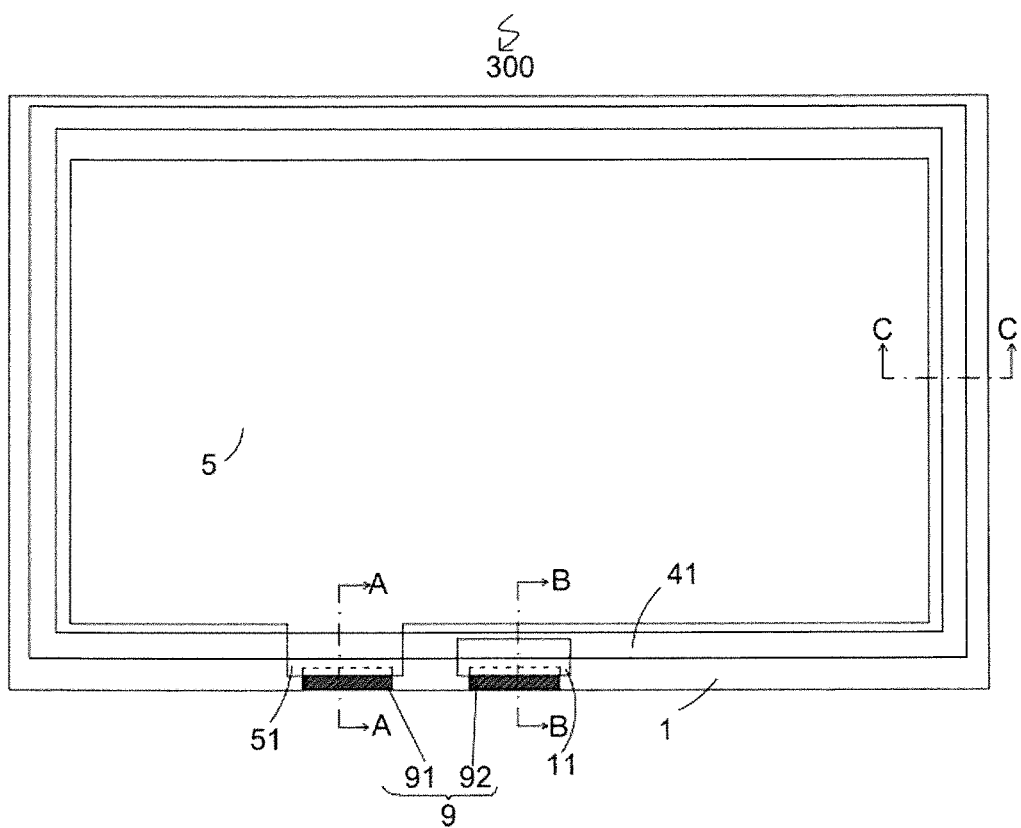
FIG. 17 is a top-view structural schematic diagram of the viewing angle control unit in FIG. 16 after removing the shade section.
Figure 18:
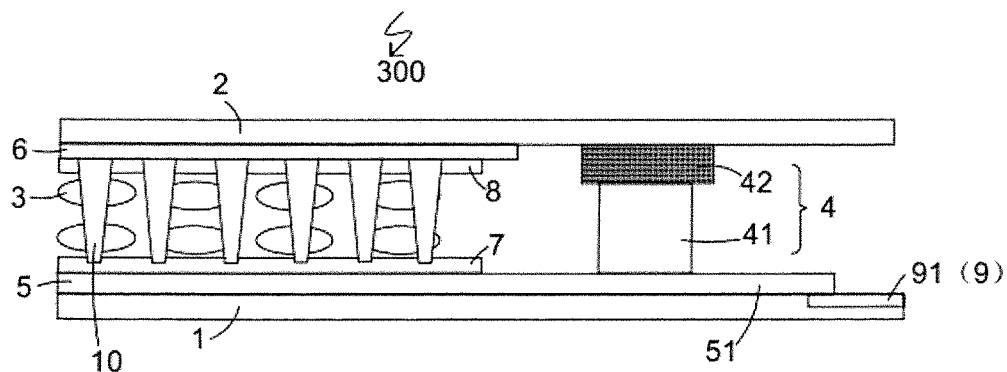
FIG. 18 is a partial cross-sectional structural schematic diagram of the viewing angle control unit in FIG. 14 taken along an A-A direction.

As shown in FIGS. 15 to 17, the main difference between the present embodiment and the first embodiment or the second embodiment is that, in the present embodiment, the viewing angle control unit 300 provided by the present embodiment has a first power supply terminal 91 and a second power supply terminal 92 disposed on the first substrate 1, and the power supply terminal structure is not disposed on the second substrate 2. In this manner, the element distribution of the viewing angle control unit 300 can be more concentrated, so that the frame packaging of the viewing angle control unit 300 is more convenient, and the manufacturing process is simplified.

The present embodiment designs a connection structure which not only realizes the electrical connection between the second light transmitting conductive layer 6 and the second power supply terminal 92 when the second power supply terminal 92 is disposed on the first substrate 1, but also guarantees that the connection ensures that the shade section 42 can absorb at least part of the scattered light caused by the seal section 41 in a region where the second light transmitting conductive layer 6 is electrically connected to the second power supply terminal 92.

Figure 19:
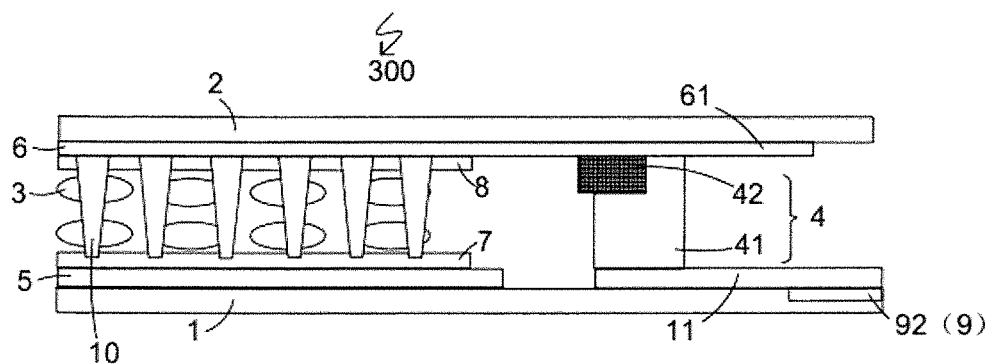
FIG. 19 is a partial cross-sectional structural schematic diagram of the viewing angle control unit in FIG. 14 taken along a B-B direction.
Figure 20:
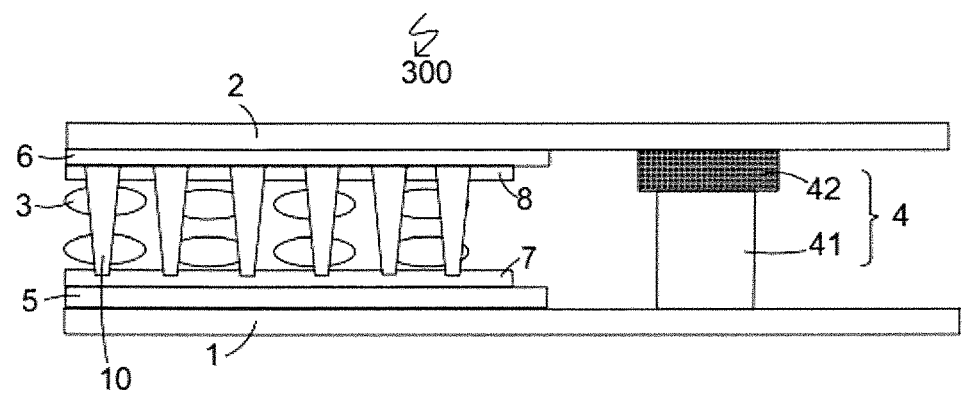
FIG. 20 is a partial cross-sectional structural schematic diagram of the viewing angle control unit in FIG. 14 taken along a C-C direction.

Specifically, as shown in FIGS. 14 to 20, the main structure of the viewing angle control unit 300 includes: the first substrate 1, the second substrate 2, the liquid crystal layer 3, the seal assembly 4, the first light transmitting conductive layer 5, the second light transmitting conductive layer 6, the first alignment layer 7, the second alignment layer 8, the power supply terminal 9 and a plurality of column spacers 10. The seal assembly 4 includes at least the seal section 41 and the shade section 42, and part of the seal assembly 4 defines a first power supply terminal wiring area 9a and a second power supply terminal wiring area 9b. In the first power supply terminal wiring area 9a, the first light transmitting conductive layer 5 has an extended layer extending from the seal section 41 outwardly of the viewing angle control unit 100, that is, the first extended layer 51. In the second power supply terminal wiring area 9b, the second light transmitting conductive layer 6 has an extended layer extending from the shade section 42 outwardly of the viewing angle control unit 100, that is, the second extended layer 61. The materials and functions of the above components are basically the same as those with the corresponding numerals in the viewing angle control unit 100 in other embodiments, and only the difference in structure with the viewing angle control unit 100 will be described below. As shown in FIGS. 17 and 19, the viewing angle control unit 300 further includes a third light transmitting conductive layer 11 formed on the first substrate 1 and electrically isolated from the first light transmitting conductive layer 5. In the second power supply terminal wiring area 9b, the third light transmitting conductive layer 11 is electrically connected to the second power supply terminal 92 disposed in the second power supply terminal wiring area 9b, and the seal section 41 is at least partially located outside the shade section 42 so as to be electrically connected to the second light transmitting conductive layer 6. Specifically, in the second power supply terminal wiring area 9b, a shade section 42 is formed on the inner side of the second extended layer 61, and a seal section 41 is formed on the outer side thereof. In this manner, the scattered light generated by the seal section 41 is at least partially absorbed and blocked by the shade section 42, and the electrical connection between the second light transmitting conductive layer 6 and the seal section 41 is realized. Further, the third light transmitting conductive layer 11 is electrically connected to the seal section 41 while electrically connected to the second power supply terminal 92, thereby achieving the electrical connection between the second light transmitting conductive layer 6 and the second power supply terminal 92.

Therefore, in the present embodiment, the seal section 41 establishes an electrical connection between the second light transmitting conductive layer 6 and the seal section 41 in such a manner that the seal section is in part located outward of the shade section 42 and is electrically connected to the extended layer of the second light transmitting conductive layer 6, that is, the second extended layer 61, thereby establishing the electrical connection between the second light transmitting conductive layer 6 and the second power supply terminal 92 located on the first substrate 1 by the seal section 41. The second power supply terminal 92 can also be disposed on the first substrate 1 with a simple structure.

Meanwhile, the scattered light caused by the partial seal section 41 is absorbed or blocked by the shade section 42 in the display direction near the liquid crystal layer side and does not affect the display performance since the partial seal section 41 is located outward of the shade section 42.

In the present embodiment, the seal section 41 is constituted by conductive adhesive material. Specifically, the seal section 41 is preferably an anisotropic conductive adhesive. The anisotropic conductive adhesive is a special conductive adhesive which is only conductive in one direction while having high resistance or not being not conductive in other directions, and can prevent two short-range conductive connection points from generating a short circuit between the lines. The components thereof can include a resin layer (not shown) and conductive particles (not shown) distributed within the resin layer. The conductive particles typically have magnetism, and can form a plurality of conductive paths with directional arrangements via the magnetic field effect. In the present embodiment, the seal section 41 is only conductive in a direction substantially perpendicular to the opposing surfaces of the first substrate 1 and the second substrate 2.

Preferably, in some embodiments of the present embodiment, the width of the shade section 42 formed on the inner side of the second extended layer 61 is greater than that of the seal section 41 formed on the outer side of the second extended layer 62. In this manner, the absorbed amount of the scattered light generated by the shade section 42 to the seal section 41 can be increased.

Fourth Embodiment

Figure 21:
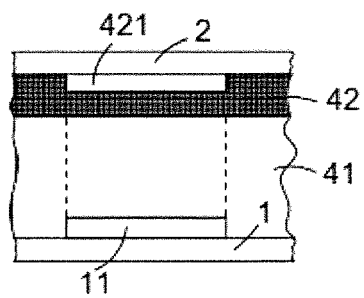
FIG. 21 is a partial cross-sectional structural schematic diagram of the viewing angle control unit in FIG. 14 taken along a D-D direction after removing the second light transmitting conductive layer.
Figure 22:
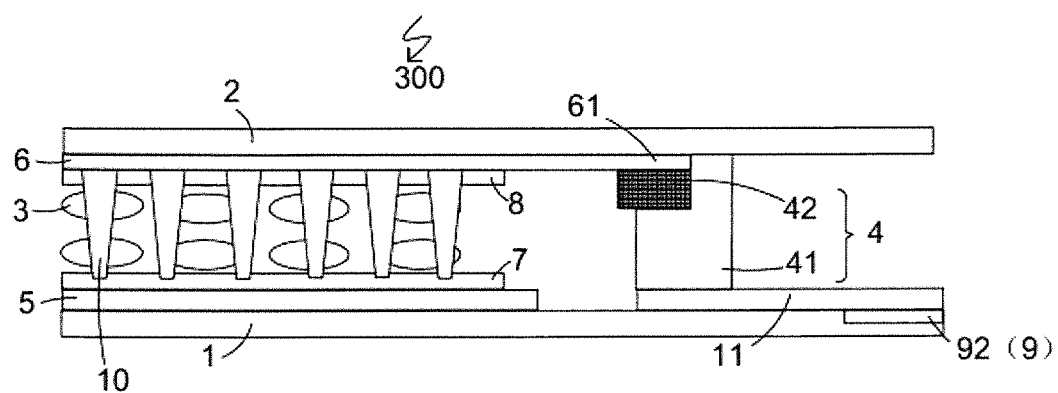
FIG. 22 is a schematic diagram of the structure of the outer side of the second extended conductive layer in contact with the inner side surface of the sealing layer in the fourth embodiment of the present disclosure.

As shown in FIG. 21, the main difference between the present embodiment and the first, the second or the third embodiment is that, in the present embodiment, the shade section 42 has a notch 421 for the second light transmitting conductive layer 6 to partially extend out in the second power supply terminal wiring area 9b. The notch 421 is disposed along the direction in which the shade section 42 surrounds the liquid crystal layer 3, and the size of the notch 421 is adapted to the second extended layer 61. Specifically, "extend" as referred to in the present embodiment includes two cases: In the first case, as shown in FIG. 19, the surface to which the second extended layer 61 extends contacts the seal section 41 so as to realize the electrical connection between the second extended layer 61 and the seal section 41. In the second case, as shown in FIG. 22, the surface to which the second extended layer 61 extends contacts a surface near the inner side of the seal section 41 so as to realize the electrical connection between the second extended layer 61 and the seal section 41.

In the present embodiment, the notch 421 is reserved for the second extended layer 61 to extend out when the shade section 42 is formed, which provides more diverse selections for the process, and also provides convenience for the electrical connection between the second extended layer 61 and the seal section 41.

Fifth Embodiment

The main difference between the present embodiment and the third embodiment or the fourth embodiment is that, in the present embodiment, the first light transmitting conductive layer 5 and the third light transmitting conductive layer 11 are disposed on the same layer. With this arrangement, the process can be simplified. Specifically, the first light transmitting conductive layer 5 and the third light transmitting conductive layer 11 are both made of indium tin oxide (ITO). The process will be at least described with forming on the first substrate 1 through etching process as an example. Firstly, a transparent indium tin oxide (ITO) conductive thin film plating is sputtered by using a magnetron sputtering method on a designated region on the first substrate 1. For the fine images of various pixels, the indium tin oxide (ITO) conductive thin film plating layer needs to be etched, that is, a photoresist is coated on the first light transmitting conductive layer 5 and the third light transmitting conductive layer 11 respectively. Then, a desired pattern is obtained by exposure and development, and etching is performed with an etching solution to form a transparent electrode pattern on the first substrate 1. In the present embodiment, although the first light transmitting conductive layer 5 and the third light transmitting conductive layer 11 are disposed separately, it is not necessary that they be disposed separately since both are disposed on the same layer. For example, in the exposure step, the first light transmitting conductive layer 5 and the third light transmitting conductive layer 11 do not need to be exposed separately, which simplifies the process steps, improves the productivity efficiency, and reduces manufacturing costs.

Sixth Embodiment

The main difference between the present embodiment and the first to fifth embodiments is that, in the present embodiment, the second light transmitting conductive layer 6 is spaced apart from the shade unit 4, which specifically refers to the second light transmitting conductive layer 6 being spaced apart from the shade unit 4 outside of the second power supply terminal wiring area 9b, so as to prevent the second light transmitting conductive layer 6 from being electrically connected to the first light transmitting conductive layer 5 by mistake through the seal section 41, which causes abnormality of the circuit. Specifically, a voltage is required to apply to the liquid crystal molecules of the liquid crystal layer 3 to realize the adjustment of the width of the viewing angle. The voltage is determined by the voltage difference between the first light transmitting conductive layer 5 and the second light transmitting conductive layer 6. If the second light transmitting conductive layer 6 is electrically connected to the first light transmitting conductive layer 5 by mistake, then a short circuit occurs, which not only fails to achieve normal deflection of the liquid crystal molecules, but may even damage the circuit.

Seventh Embodiment

The main difference between the present embodiment and the third embodiment is that, in the present embodiment, the inner surface of the shade section 42 is located further inward of the viewing angle control unit 300 than the inner surface of the seal section 41 so as to provide certain protection for the seal section 41. The protection mentioned in the present description mainly refers to the protection of the sealing performance of the seal section 41. The overflow of the materials is easily to occur due to the deviation of the process in each processing step. For example, when the second alignment layer 8 is formed on the second substrate 2, the raw material of the second alignment layer 8 is substantially in a liquid state, so that the second alignment layer 8 may overflow if not cured in time during the process when pressing and packaging the second substrate 2 and the first substrate 1. The overflow material of the second alignment layer 8 is not directly in contact with the seal section 41 since the inner surface of the shade section 42 is located more inward of the viewing angle control unit 300 than the inner surface of the seal section 41 and due to the blocking of the shade section 42, thereby preventing the seal section 41 from being affected by the overflow material. That is, the seal section 41 is protected.

Eighth Embodiment

Figure 23:
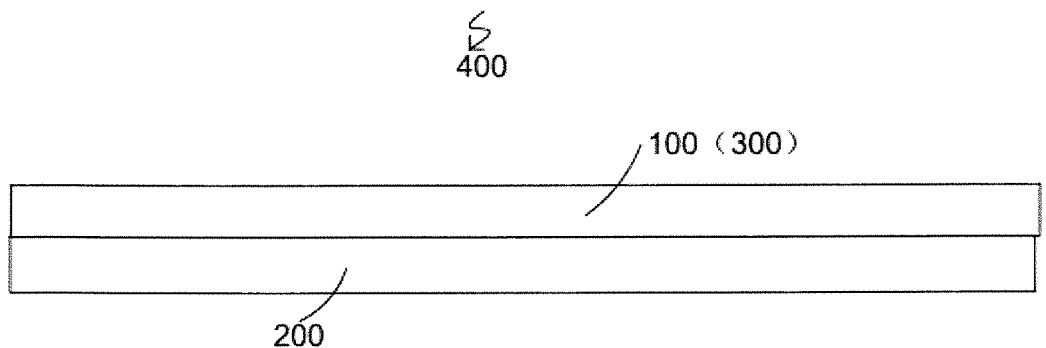
FIG. 23 is a structural schematic diagram of a display device in an eighth embodiment of the present disclosure.

As shown in FIG. 23, the present embodiment provides a display device 400 which includes at least a liquid crystal display unit 200 and at least one viewing angle control unit added to the display surface thereof. The viewing angle control unit can be the viewing angle control unit 100 or the viewing angle control unit 300 shown in any of the first to seventh embodiments.

In the present embodiment, the liquid crystal display unit 200 can be an existing liquid crystal display screen which is commercially available.

In the present embodiment, the display device 400 can be applied to cell phones, computers, televisions, or other electronic products with liquid crystal display functions in order to meet the requirements of users to protect privacy or other differential display of viewing angle.

Those skilled in the art will appreciate that in the various embodiments described above, numerous technical details are set forth for the reader to better understand the present application. However, the technical solutions set forth in the claims of the present application can be substantially realized even without these technical details, and various changes and modifications based on the above embodiments. Therefore, various changes can be made to the above embodiments in forms and details in practical applications without departing from the spirit and scope of the disclosure.

The invention claimed is:
1. A viewing angle control unit, comprising:
a first substrate;
a second substrate which opposes said first substrate;
a liquid crystal layer arranged between said first substrate and said second substrate;
a seal assembly, which is disposed between said first substrate and said second substrate and surrounds said liquid crystal layer;
a first light transmitting conductive layer arranged on a surface of said first substrate facing said second substrate;
a second light transmitting conductive layer arranged on a surface of said second substrate facing said first substrate, said second light transmitting conductive layer being opposed to said first light transmitting conductive layer with said liquid crystal layer therebetween;
a first power supply terminal electrically connected to said first light transmitting conductive layer; and
a second power supply terminal electrically connected to said second light transmitting conductive layer,
wherein at least a part of said seal assembly includes a seal section and a shade section which are stacked in a direction substantially perpendicular to opposing surfaces of said first substrate and said second substrate,
wherein said shade section is provided on a side of said second substrate facing said first substrate, and said seal section is formed between said shade section and a side of said first substrate facing said second substrate,
wherein at least a part of said seal section includes a conductive adhesive material,
wherein part of said seal assembly defines a first power supply terminal wiring area and a second power supply terminal wiring area, and in said second power supply terminal wiring area, said second light transmitting conductive layer includes an extended layer extending from said shade section outwardly of said viewing angle control unit, and said seal section, at least in part, is located outward of said shade section so as to be electrically connected to said extended layer, and
wherein said shade section has a notch for said second light transmitting conductive layer to extend out in said second power supply terminal wiring area.

2. The viewing angle control unit according to claim 1, wherein a width of said shade section is greater than a width of said seal section in a direction in which the seal assembly surrounds said liquid crystal layer.

3. The viewing angle control unit according to claim 1, wherein said seal section has anisotropic conductivity and is conductive in the direction substantially perpendicular to opposing surfaces of said first substrate and said second substrate.

4. The viewing angle control unit according to claim 1, wherein said first power supply terminal and said second power supply terminal are disposed on said first substrate.

5. The viewing angle control unit according to claim 1, wherein in said second power supply terminal wiring area, said viewing angle control unit further includes a third light transmitting conductive layer formed on said first substrate and electrically isolated from said first light transmitting conductive layer, and said third light transmitting conductive layer is electrically connected to said second power supply terminal.

6. The viewing angle control unit according to claim 5, wherein said first light transmitting conductive layer and said third light transmitting conductive layer are formed in a same layer.

7. The viewing angle control unit according to claim 5, wherein said second light transmitting conductive layer is spaced apart from said seal assembly.

8. The viewing angle control unit according to claim 1, wherein in said first power supply terminal wiring area, said first light transmitting conductive layer is located between said seal assembly and said first substrate, and is electrically connected to said first power supply terminal.

9. The viewing angle control unit according to claim 1, wherein an inner surface of said shade section is located inward of said viewing angle control unit when compared with an inner surface of said seal section.

10. The viewing angle control unit according to claim 1, wherein said shade section is a Black Matrix.

11. The viewing angle control unit according to claim 1, wherein a thickness ratio of said shade section to said seal section is 1:1.5~1:3.0 in the direction substantially perpendicular to opposing surfaces of said first substrate and said second substrate.

12. A display device, wherein said display device comprises the viewing angle control unit according to claim 1.

* * * * *